S. HALVORSEN.
NEWSPAPER FEEDING DEVICE.
APPLICATION FILED MAY 14, 1917.

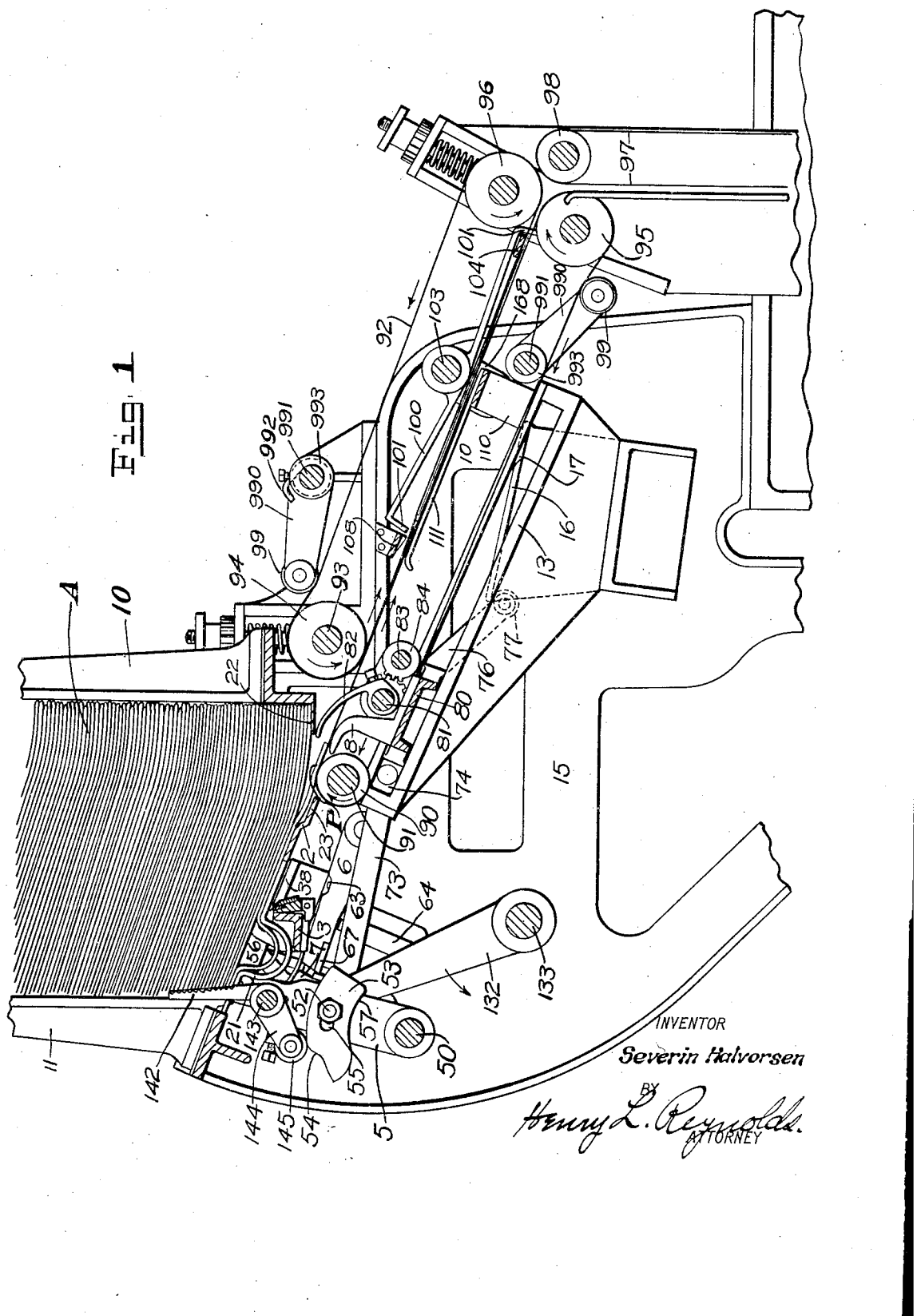

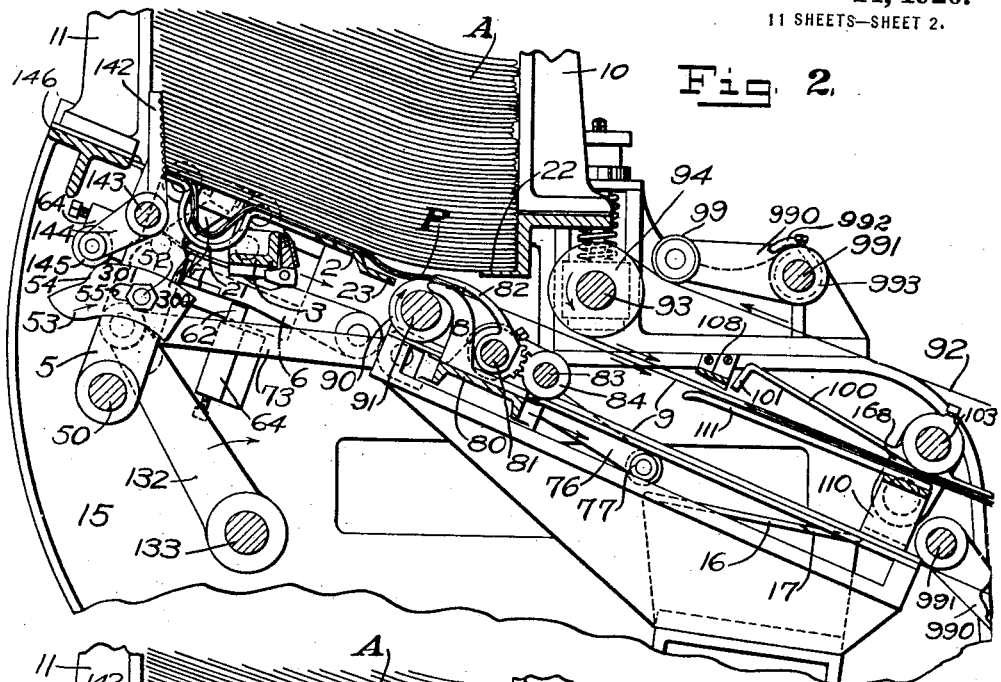
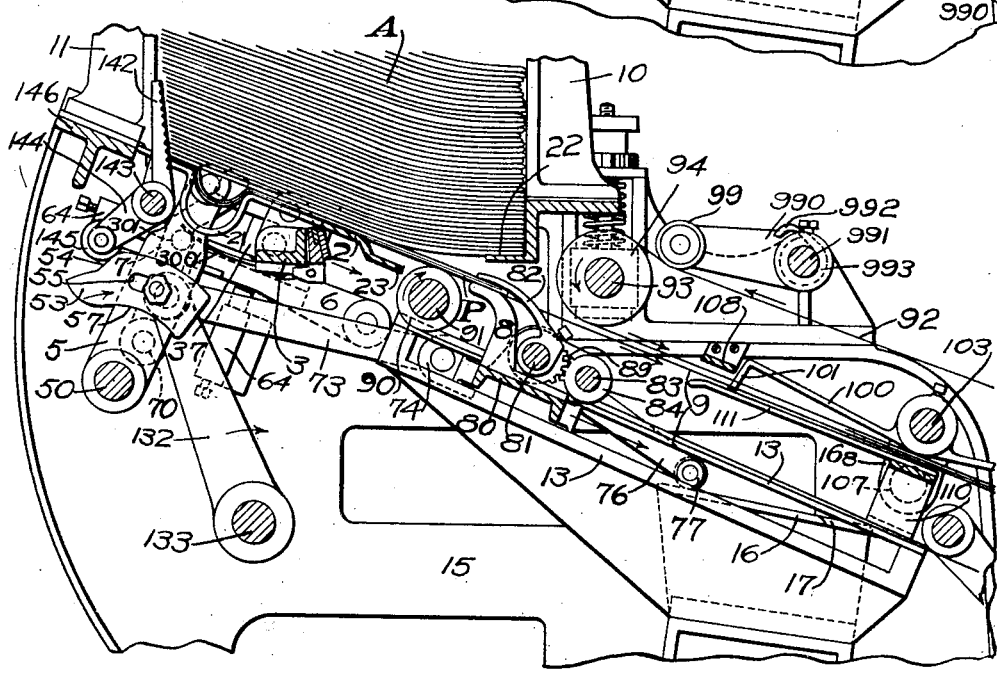

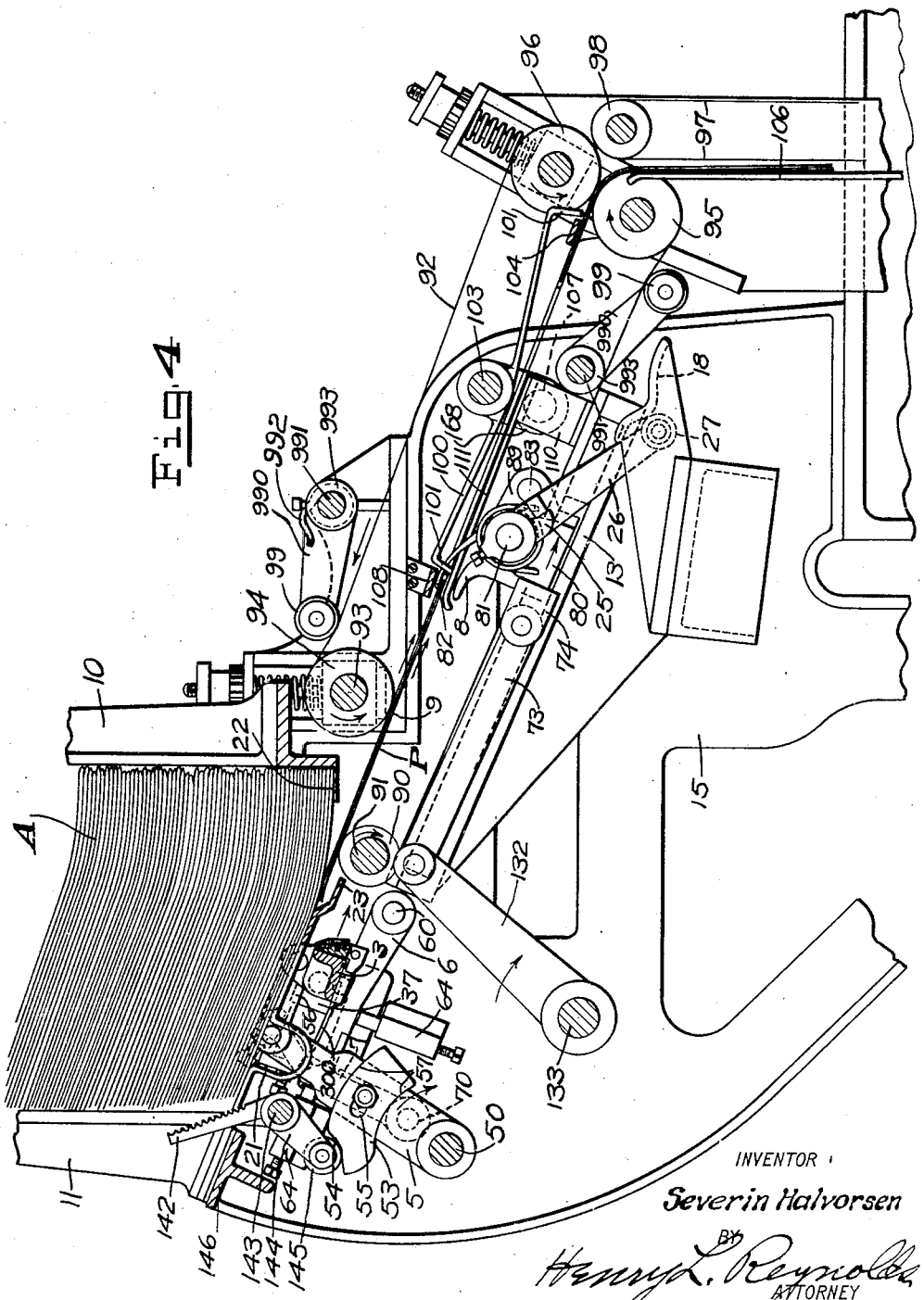

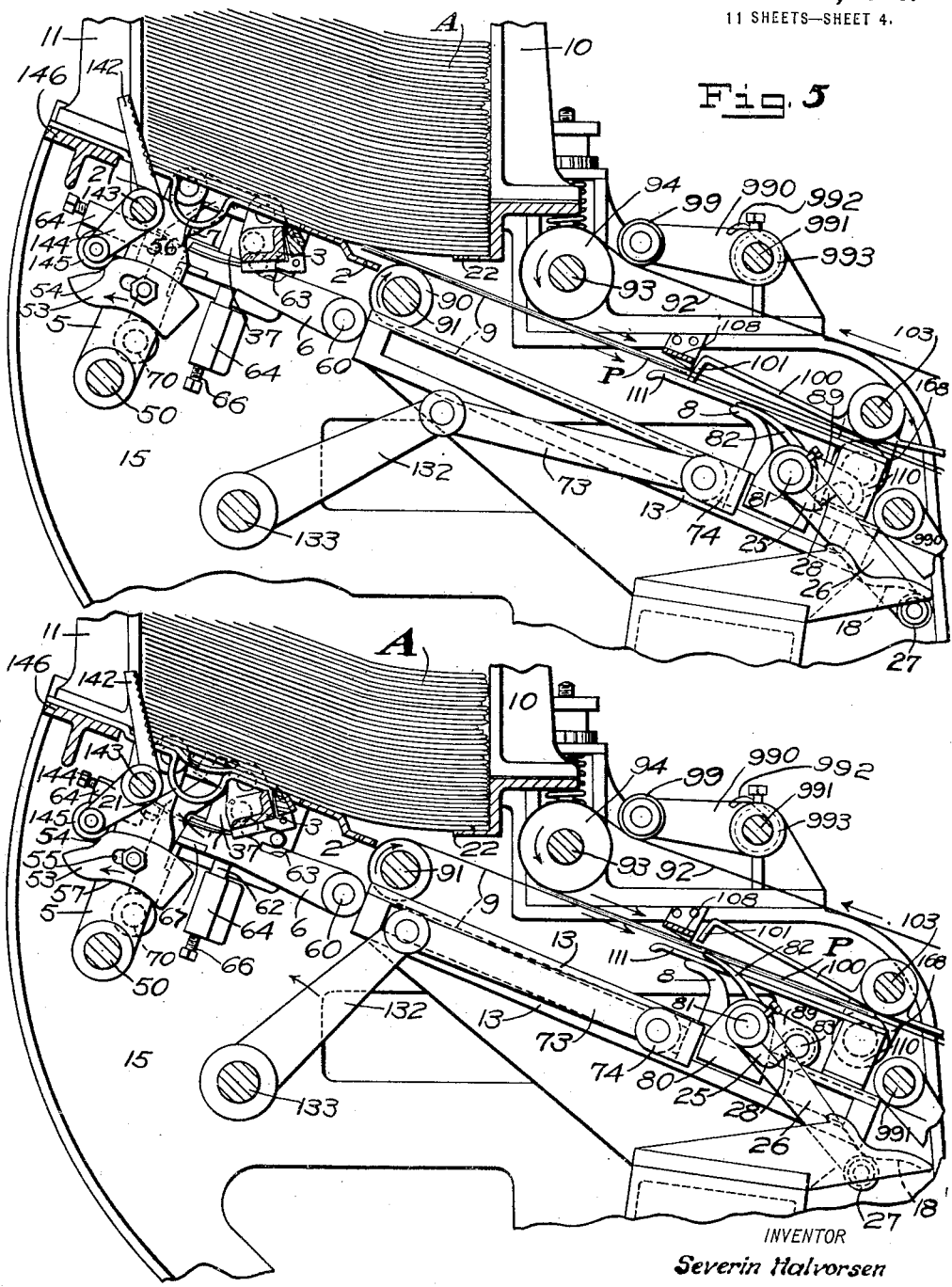

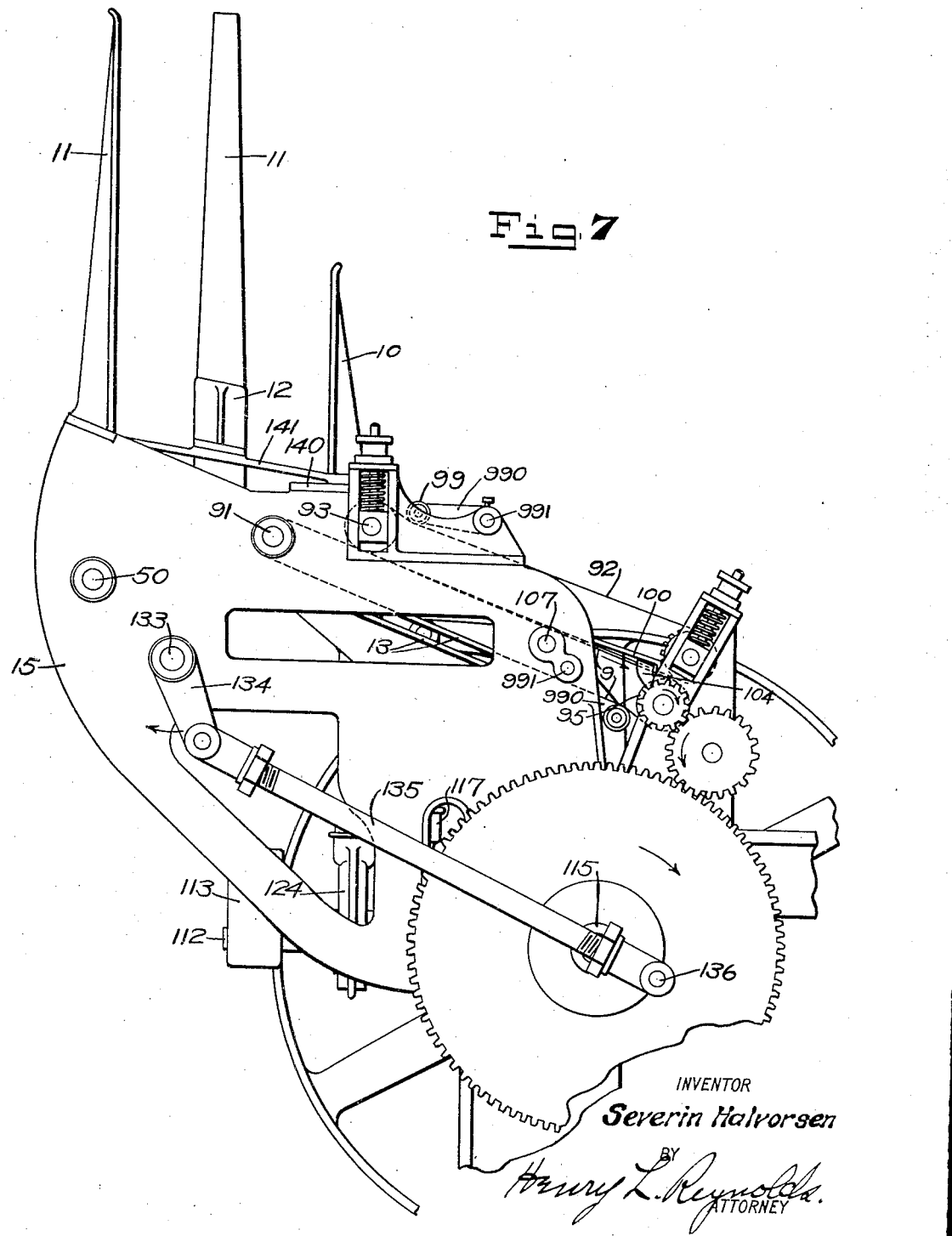

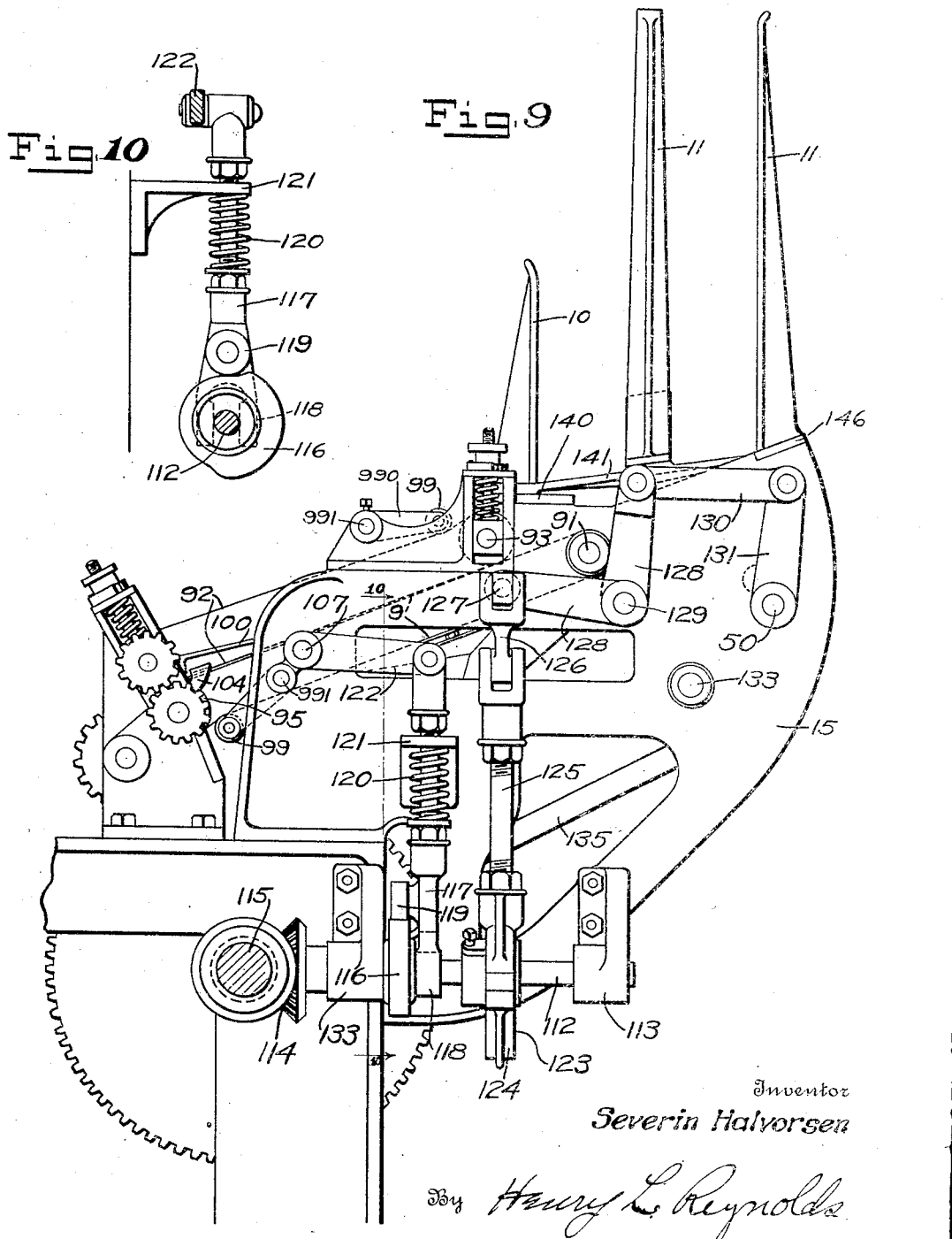

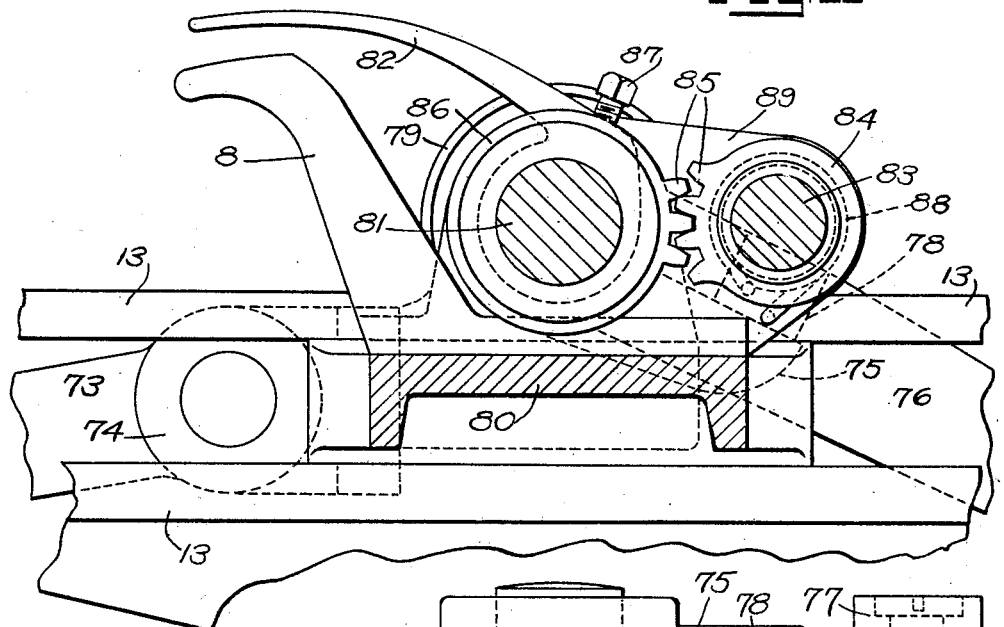
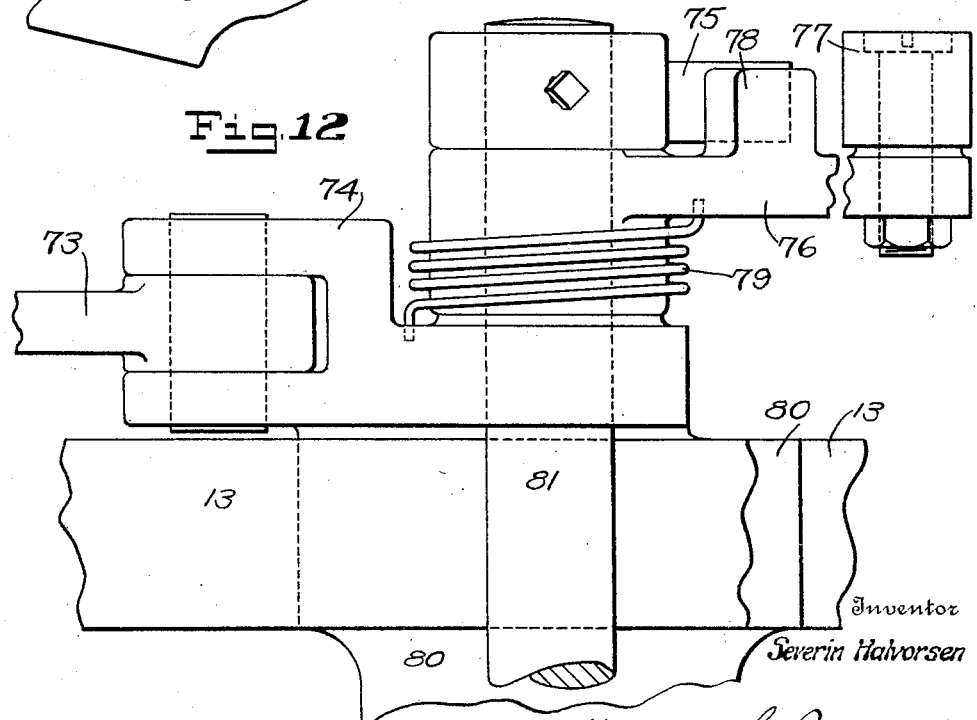

1,361,986.

Patented Dec. 14, 1920.
11 SHEETS—SHEET 9.

Inventor
Severin Halvorsen

By Henry L. Reynolds
Attorney

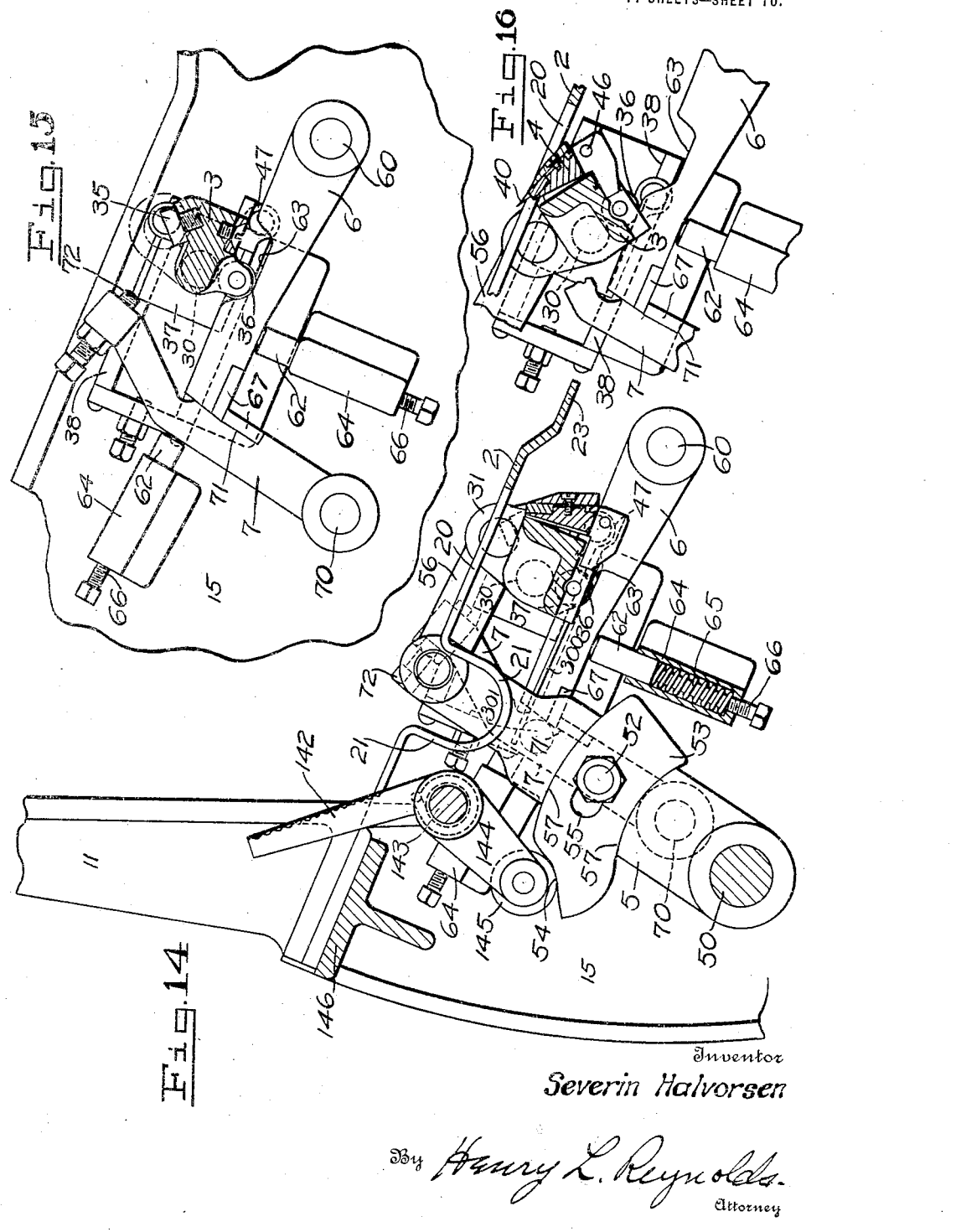

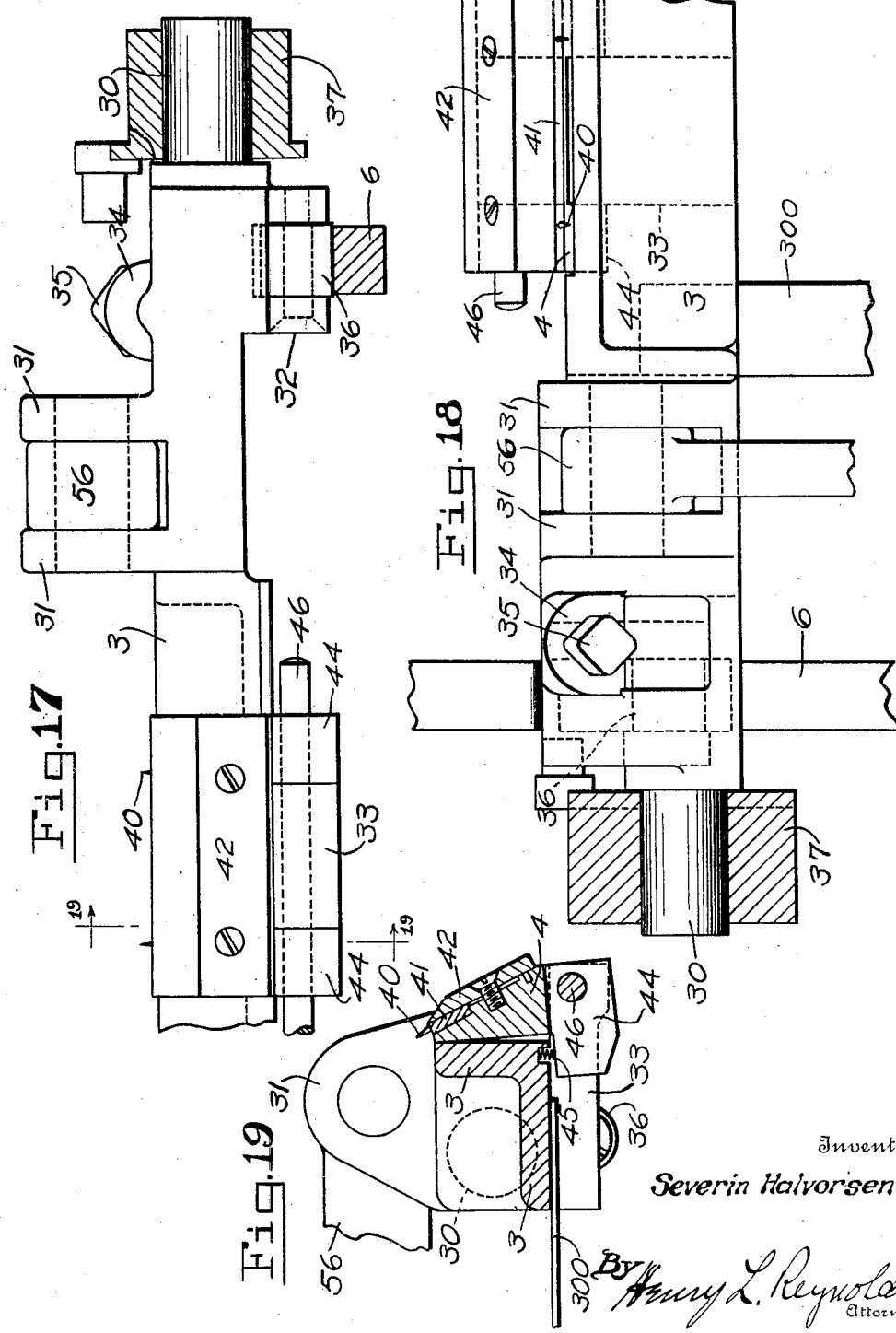

UNITED STATES PATENT OFFICE.

SEVERIN HALVORSEN, OF SEATTLE, WASHINGTON, ASSIGNOR TO THE NEWSPAPER STUFFING MACHINES COMPANY, OF SEATTLE, WASHINGTON, A CORPORATION OF WASHINGTON.

NEWSPAPER-FEEDING DEVICE.

1,361,986.      Specification of Letters Patent.      Patented Dec. 14, 1920.

Application filed May 14, 1917. Serial No. 168,361.

*To all whom it may concern:*

Be it known that I, SEVERIN HALVORSEN, a citizen of the United States, and resident of the city of Seattle, county of King, and State of Washington, have invented certain new and useful Improvements in Newspaper-Feeding Devices, of which the following is a specification.

My invention relates to paper feeding apparatus by which a single paper may be withdrawn at a time from a stack and fed to another apparatus. The object of my invention is to produce a device for this work which is thoroughly reliable and dependable in operation, which is capable of operating at a high rate of speed and which is capable of ready and quick adjustment for papers of different thickness. Another object is to so design and construct the device that its parts will be durable, being not likely to break or wear out.

The features of my invention which I consider novel and upon which I desire patent will be defined by the claims which terminate this specification.

In the accompanying drawings I have shown my invention in the form of construction which is now most preferred by me.

Figures 1 to 6 inclusive are sectional side elevations of the part of the machine which contains the paper feeding mechanisms which constitute this invention. The line of section employed is in part just within the side frame and in part through the central portion of the apparatus. The different figures show the parts in different positions.

Fig. 7 is a side elevation of the same parts of the machine taken from the same side.

Fig. 9 is a side elevation taken from the opposite side.

Fig. 10 is a side view of the mechanism employed for actuating the stripper fingers.

Fig. 11 is a detail cross section showing the paper gripping fingers in elevation.

Fig. 12 is a top plan view showing the mechanism for actuating the paper gripping fingers.

Fig. 14 is a sectional elevation taken through the needle bar and its operating mechanism and through the paper jogging mechanism.

Figs. 15 and 16 are sections through the needle bar showing different positions of parts.

Fig. 17 is a side elevation, and Fig. 18 a top plan view of one end of a needle bar, including one needle carrying block.

Fig. 19 is a cross section through one of the needle carrying blocks.

Figure 8:
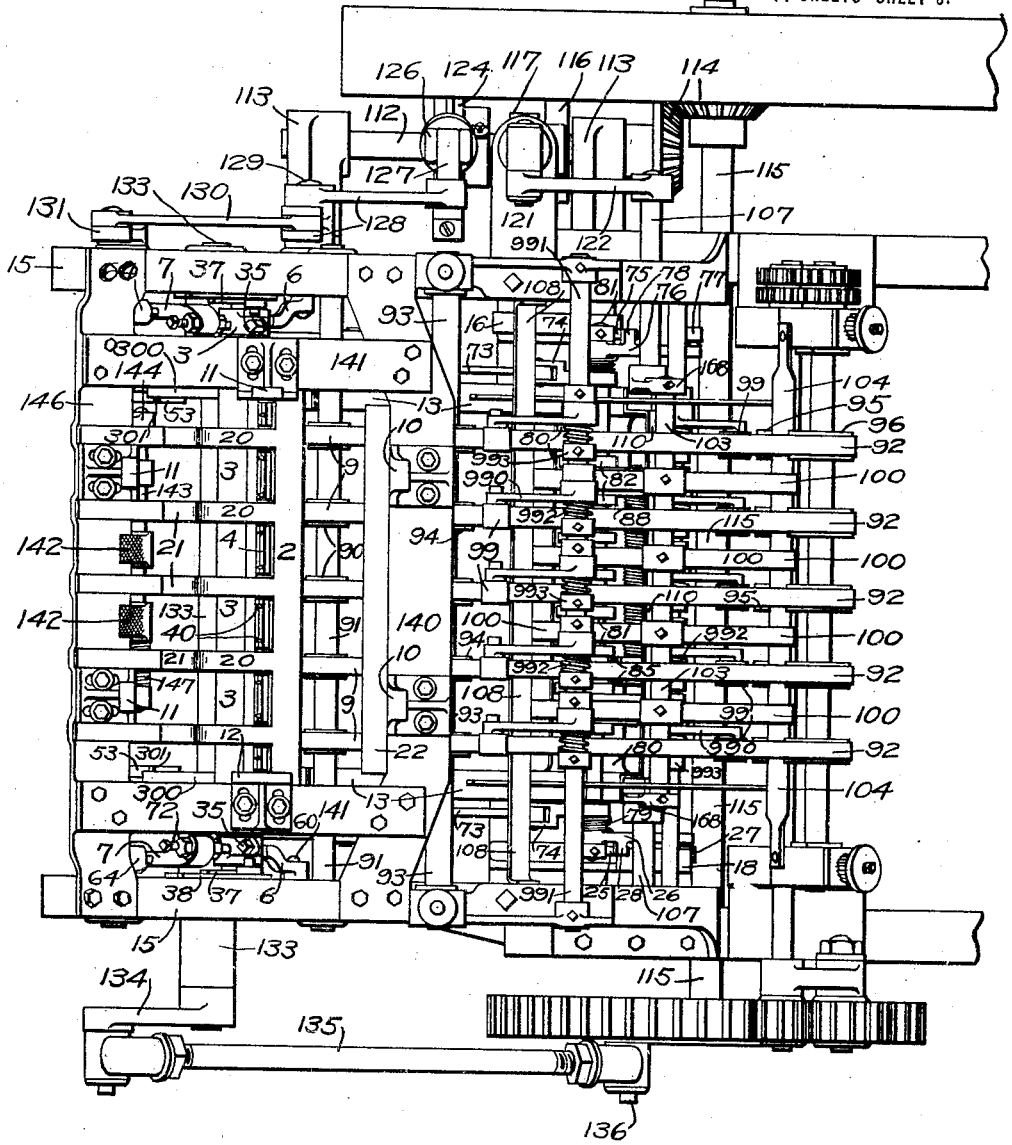
Fig. 8 is a top plan view of the same parts.

The paper feeding mechanism illustrated in connection herewith and herein described, has been especially designed for use with a newspaper stuffing machine, such for instance, as those shown in my previous applications for patent, Serial No. 33,311, filed June 10, 1915, and Serial No. 59,151, filed November 1, 1915. It is, however, applicable to other uses than this and I do not desire to have it considered as being limited to this use alone. As a matter of convenience I will however describe it as applied to this particular use.

A magazine or receptacle for holding the papers to be fed, is provided. This, in its preferred form, has its sides composed of vertical posts or bars, 10, 11 and 12, of which the posts 10 are at one side the pile and are of moderate height, the posts 11 are at the other side and at one end and are higher, while the post 12 is quite short and is at the other end. The post 12 is at the end toward the operator. This and the posts 10 are made shorter than the others for convenience in placing the papers in the magazine.

The bottom for this magazine is non-continuous, being provided with certain openings to facilitate handling the papers in the manner adopted and herein described. As shown, this bottom comprises a bar 2 which extends lengthwise the magazine, or across the machine, and arms or fingers 20 which extend laterally from the bar 2. The fingers 20 each have a downwardly extending loop 21 which accommodates the downward fold produced in the lowermost paper by the preliminary backward movement thereof in the process of its removal.

The bottom also comprises a narrow ledge 22, which extends along the edge from which the papers are withdrawn. The papers are placed in the magazine folded to half-page size and with the folded edge toward the side from which they are withdrawn, their folded edge resting upon the ledge 22. The bar 2 is set back from the ledge 22 a distance which is sufficient for conveniently operating certain of the paper removing mechanisms, as will be later described.

The first step in the removal of a paper consists in engaging it from beneath to move it backward enough to withdraw it from the ledge 22, thereby causing this ledge to drop into position to be properly positioned for engagement by the paper gripping fingers. Its folded edge is then engaged by these gripper devices and the paper pulled out from beneath the pile.

The means employed for the preliminary backward movement of the paper comprises a needle carrying bar which extends across the machine beneath the magazine and which is reciprocated in a direction transverse to its length. This needle bar is shown separately in Figs. 17, 18 and 19, and in detail with associated parts in Figs. 14, 15 and 16, as well as in the assembled views in Figs. 1 to 6.

The central body 3 of the needle bar has been shown as of angle section, although this is not material. At each end it has a journal 30 which enters a slide block 37, which is in turn mounted to slide in guide-ways 38, (see Figs. 14–16) carried by the frame.

Disposed at intervals along the length of this bar, such that they do not conflict with the fingers 20, are needle carrying blocks 4. These are recessed to seat the needle plates 41, which have formed therefrom or integrally secured thereto, the needles 40. These needle plates are made in sets in which the length of the needles in all the plates of a set is alike, but those of different sets are unlike.

The blocks 4 are recessed to receive the plates 41. The plates are held by clamping plates 42. The blocks are pivoted upon pivot pins 46 to have a limited rocking movement. An arm 44, extending under the bar 3, limits the amount of this rocking movement. A spring, as 45, normally holds the needle edge of the block against the bar 3.

The needle bar at each end has lugs 31 extending upward, between which is pivotally connected an actuating link which is also connected with the swinging end of lever arm 5. This arm is given an oscillatory movement of small extent through means which will be described later.

Pivoted upon the frame 15, at 60, preferably at each side, is what I term a trigger arm, 6. This arm is placed directly beneath a roller 36 which is journaled between ears 32 at the under side of the needle bar. This trigger arm has a transverse depression or notch 63 into which roller 36 drops when the needle bar is in its extreme position toward the paper discharge side of the magazine. In this position the needle bar is in the position shown in Figs. 4 and 14. The notch 63 is, however, best shown in Figs. 1, 5 and 6.

The trigger arm or lever 6 is raised to normal position by a spring 65 contained in a case 64 and acting through a pin or piston 62. The tension of this spring may be adjusted by a set screw 66. The swinging end of this trigger lever is supported when raised by a catch lever 7, which is pivoted at 70 from the frame and has a notch at 71 to supportingly engage the tip of the trigger lever 6. The engaging surfaces of both these levers should preferably consist of inserted hardened plates, as 67.

The catch lever 7 is yieldingly held against the trigger lever 6 by a spring. As shown, this is of the same kind and mounted in the same way as described for the trigger lever 6, being a duplication of the parts 62, 64, 65 and 66. The particular kind of spring and the manner of its mounting is immaterial.

The catch lever 7 is extended upward and has its free end positioned so as to be engaged by a portion of the needle bar, or by a member carried thereby, to thereby be moved outwardly so as to release the trigger lever 6. The released position of these levers is shown in Figs. 1, 2 and 3. The catch lever and the needle bar are preferably both provided with adjustable contact bolts 72 and 35, of hardened steel, to thereby keep wear down and to permit adjustment and timing of parts.

As the needle bar actuating lever 5 starts its movement toward the left hand, as the machine is shown in Figs. 1 to 6, the first effect is to rock the needle bar upon its pivot supports to thus throw the needle points up into contact with the paper. The next result is to halt the needle points until the lower arm 44 contacts with the lower side of the needle bar.

At about this point the forward bodily movement of the bar starts, without however wholly stopping the rocking action. The roller 36 up to this time has been resting in the recess 63 in the upper surface of the trigger lever or arm 6. The forward movement of the needle bar causes roller 36 to ride out of the recess 63, thus positively rocking the needle bar farther. This position is shown in Fig. 16. The needles having been well embedded in the paper the movement of the needle bar will draw the lowermost paper backward, which buckles it down into the gap formed by the bends 21 in their supporting bars. The folded edge of the paper will be drawn off the ledge 22 and left in position to be gripped by the gripping fingers, as is shown in Fig. 1.

Figure 13:
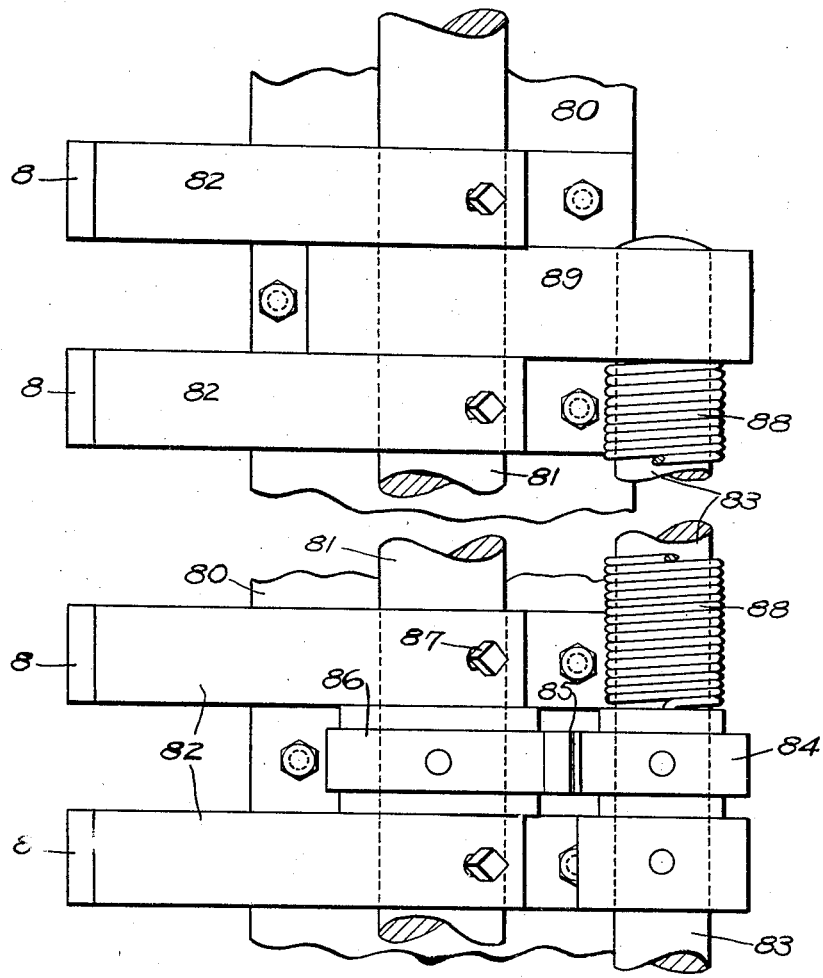
Fig. 13 shows in top plan view central sections of the paper gripping bar with its gripping fingers.

The paper gripping fingers are shown in detail in Figs. 11, 12 and 13, and in relation to the other parts in Figs. 1 to 6. A bar 80 extends transversely across the machine and slides on guideways 13 which extend lengthwise the machine. Journaled in bearing lugs 89 carried by bar 80 are two shafts 81 and 83. The shaft 81 is further journaled in lugs 74 outside the guides 13, which lugs are forked to form a pivotal attachment for the actuating link 73.

The shaft 83 is shorter and does not reach to the guideways 13. Its use is largely dictated by lack of space on the shaft 81 for the spring 88 by which the gripping fingers are held together. The shafts 81 and 83 are connected by toothed segments 85 on collars 84 and 86 secured to the respective shafts.

The bar 80 has fixed gripper fingers 8. Complemental gripper fingers 82 are secured to shaft 81. Upon shaft 83 are torsion springs 88 which act to close the fingers 82 upon fingers 8. Secured to the end of shaft 81 is a lever arm 75. Loose on shaft 81 is a lever arm 76, this being held by spring 79 in engagement with arm 75, as through the side projecting lug 78.

The arm 76 carries a cam roller 77, which engages an inclined cam flange 16 supported from the frame. This flange is shorter than the length of stroke of the gripper bar and is cut away at 17 to permit the passage of the cam roller from above to below the flange. The transfer in the opposite direction is made at the opposite end of flange 16.

In the position shown in Fig. 1, the gripper bar is still moving toward the left, as is indicated by the arrow. The engagement of the cam roller 77 with the underside of flange 16 during the backward (left hand) movement of the gripper bar, causes depression of lever 76 and the consequent raising of gripper fingers 82.

Cam roller 77 is not freed from cam flange 16 until after the gripper fingers have embraced the folded edge of the paper P. The position just before clearing cam flange 16 is shown in Fig. 1. Upon the roller 77 clearing cam flange 16, the upper gripper fingers are thrown upon the paper gripping it firmly. Backward movement of gripper bar will then draw out the paper P.

Successive positions of these parts are shown in Figs. 2 and 3. In Fig. 2 the cam roller 77 has not yet engaged the cam flange 16, although it is above its end. As the lever 76 is swung upward by the action of flange 16 upon roller 77, the levers 75 and 76 separate, thus conveying no rocking movement to shaft 81 and fingers 82. As roller 77 reaches the point 17 where the cam flange 16 ends, it drops down to such a level that on the return movement the cam roller 77 will engage the under side of the flange, to thereby open the gripper fingers.

At the other end of the shaft 81 are two other lever arms 25 and 26, similar in construction and action to the levers 75 and 76. The lever arm 25 is fixed to the shaft 81 and the arm 26 is loose thereon and actuated through a side projecting lug 28. A spring corresponding to spring 79 is also used.

The cam flange 18 is of different outline and engages the roller 27 throughout only a small portion of its stroke and the roller contacts only with the lower side of the flange. The position shown in Fig. 4 is that occupied just after the roller strikes the cam. The arm 26 has been depressed and the fingers opened, but not yet removed from the edge of the paper P. Further movement backward of the gripper bar will withdraw the fingers from the paper, as is shown in Fig. 5.

The paper as drawn from the bottom of the pile is drawn between feed tapes 9 and 92 which pass, respectively, over rollers 90, 95, and 94, 96. These tapes move as shown by the arrows. At or about the time the gripping fingers release the paper it strikes the down turned ends 101 of the stop or stripper fingers 100 and its movement is checked.

The fingers or arms 100 are secured to a shaft 103 which is carried by short arms 168 and these are pivoted at 107 upon a part of the frame. The offset location of the pivot axis relative to the main part of the bar is an immaterial feature arising merely from convenience in locating the parts so as to not interfere with other parts of the mechanism. The fingers 100 extend in both directions from the shaft 103. When one end is down in position to engage a paper the other is raised. The papers are held against raising by the lifting of the fingers by bars 104 and 108.

These stripper fingers are actuated by any suitable means. The means employed in this particular case are shown in Figs. 9 and 10. The shaft 112 is journaled in brackets 113 and has a two throw cam 116 thereon. A bar 117 has a yoke 118 which spans the shaft and thus prevents side movement transversely of the shaft. A cam roller 119 carried by bar 117 engages the cam 116 to give the bar a slight lengthwise movement. The return movement is caused by the spring 120, the bar 117 is guided in bracket 121 which also forms a thrust support for the spring 120. The bar 117 is pivoted to the arm 122 which is secured to an extension of one of the pivot axes 107 of the stripper fingers. The cam 116 has its reciprocal throw periods placed opposite.

Upon the same shaft 112 is secured an eccentric 123 upon which is an eccentric strap 124 secured to a rod 125. This rod is connected with bell crank lever 128, pivoted at 129, by a universal pivot coupling, which, as shown, consists of a link 126 which pivotally connects the rod 125 with a pivot pin 127 carried by the bell crank lever. The bell crank lever is connected by link 130 with the shaft 50 upon which is secured the crank arm or lever 5 which actuates the needle bar. See Figs. 1 to 6.

The gripper bar 80 is actuated through links 73 from crank arms 132 carried by shaft 133. This shaft has a crank arm 134, actuated by a link 135 from the crank pin 136, carried by the main shaft 115.

Two joggers, consisting of crank arms 142 secured on a shaft 143, engage the rear edge of the stack of papers in the magazine and by their reciprocation force the folded edge of the papers close against the posts 10 at the opposite side of the magazine. The arm 5 carries a tappet plate 53, adjustable by sliding within a shallow segmental annular recess which closely fits the edges 57. Clamping bolt 52 and slot 55 permit adjustment and clamping within certain limits. A cam surface 54 engages a cam roller 145 on arm 144 to rock the shaft 143 and the jogger arms 142. A spring 147 returns the jogger arms to their outer position.

The position of the adjacent runs of the feed tapes 9 and 92 between which the paper is carried, makes a slight angle with the path of movement of the gripper fingers, so that, while they substantially coincide at the upper or rear end of the path, the fingers drop below the tapes at the lower or forward end of the path. In drawing out the paper the fingers tend to draw down the tapes and when the fingers are freed from the tapes the latter rise enough to remove the paper from the return path of the fingers. To better support the paper at this point, fingers 111, carried by a bar 110, are used. These lie below the stripper fingers 100.

To insure that the tapes 9 and 92 are kept taut so that they will not drop enough to permit the paper to be engaged by the gripper fingers 8 and 82 on their return movement, tighteners are employed, one for each tape. A fixed shaft 991 has arms 990 loose thereon and having journaled thereon rollers 99 positioned to engage each its respective tape. Shaft 991 has set collars 993 fixed thereon and torsion springs 992 connecting the set collars with the arms 990. The fixed fingers 111 also serve in preventing sagging of the papers at the point where they might otherwise be engaged by gripper finger 82 on its return movement.

The needle bar 3 is acted upon by a spring or springs tending to turn it back into position of disengagement with the papers. For this purpose I have shown the use of flat springs 300 fixed on the needle bar and projecting laterally backward therefrom. The outer end of the spring bears upon a pin or roller 301 carried by the rock arm 5.

The posts 10 which form the front side of the paper magazine are supported from a bar 140 which extends across the machine, the rear posts 11 from another like bar 146 and the end posts 11 and 12 from bars 141.

It is believed that the operation of the machine has been set forth with sufficient clearness and fullness in the description of its construction that further explanation is not needed. The papers after being withdrawn from the magazine may be conveyed by any suitable means to any point desired.

What I claim as my invention is:

1. A means for removing papers from a pile comprising a needle carrying bar mounted to be reciprocated transversely of its length across a face of the pile said bar having pivot bearings with their axis extending lengthwise the bar, slide blocks having bearings for said pivot bearings, guideways for said blocks, and actuating means connected with said bar eccentrically of its pivot axis.

2. A device for removing single papers from a pile comprising a bar mounted to be reciprocated transversely of its length and parallel with a face of the pile and to be rocked upon a longitudinal axis, a series of blocks pivoted thereon to have a limited movement about an axis parallel with the length of the bar, paper engaging needles carried by said blocks, means for reciprocating the bar connected thereto eccentric to its pivot axis.

3. A device for removing papers from a pile comprising guideways paralleling and close to a face of the pile, blocks mounted to slide in said guideways, a bar journaled in said blocks, paper engaging needles carried by said bar and projecting transversely thereof, actuating means connected with the bar eccentric to its pivot axis, and limiting stops carried by the bar and its carrying blocks.

4. A device for removing papers from a pile comprising a bar mounted for movement transversely of its length adjacent the face of the pile and for rocking movement about a longitudinal axis, paper engaging needles carried by said bar with their points eccentric to its rocking axis, a cam follower carried by the bar eccentric of said axis, a cam track engaging said follower, and means for reciprocating said bar.

5. A device for removing papers from a pile comprising a bar mounted for movement transversely of its length adjacent the face of the pile and for rocking movement about a longitudinal axis, paper engaging needles carried by said bar with their points eccentric to its rocking axis, a cam follower carried by the bar eccentric of said axis, a cam track engaging said follower, means for reciprocating said bar, and means for shifting said cam track during the return movement of the bar.

6. In a paper feeding machine, in combination, a paper holding magazine, a paper releasing mechanism mounted for reciprocation beneath the magazine, paper jogging arms mounted upon a shaft at the rear side of the magazine, a rock arm for actuating the paper releasing mechanism, a crank arm secured to the shaft of the jogging arms and a tappet cam carried by the rock arm which actuates the paper releasing mechanism in position to engage and actuate the crank arm of the jogging device.

7. In a paper feeding machine, in combination, a paper holding magazine, a paper releasing mechanism mounted for reciprocation beneath the magazine, paper jogging arms mounted upon a shaft at the rear side of the magazine, a rock arm for actuating the paper releasing mechanism, said arm having a seat forming a circular arc concentric with the pivot of the arm, a tappet cam seated in and adjustable upon said seat, and a crank arm secured to the jogging shaft and having a follower engaged by said tappet cam.

8. A device for removing papers from a pile comprising a bar mounted to reciprocate transversely of its length along the face of the pile, paper engaging means carried by this bar and adapted to be moved to engage with and to be disengaged from the outermost paper of the pile, and means for reciprocating said bar through said paper engaging means to thereby engage the papers during movement in one direction only.

9. A device for removing papers from a pile comprising a bar mounted to reciprocate transversely of its length along the face of the pile, paper engaging means carried by this bar, and adapted to be moved to engage with and to be disengaged from the outermost paper of the pile, a crank arm and cam track through which said needle engaging means is operated, means for reciprocating said needle carrying bar and means for moving said cam track out of operative position during the return movement of the needle carrying bar.

10. In a paper feeding device, a bar mounted to have a bodily reciprocatory movement transversely of its length along one face of the papers, and oscillatory movement about a longitudinal axis, means for giving said bar its transverse movement, a crank arm carried by the feed bar and carrying a cam follower, an arm having a cam track for engagement by said follower axis extending in the direction of the transverse movement of said bar and pivoted at one end, a supporting bar for the other end of the said bar and having an end engaged by the feed bar to be thereby freed from supporting engagement with the cam-track arm, and means acting to return both arms to normal position.

11. In a device of the character described, a feed bar having a lateral reciprocating movement and a rocking movement about a longitudinal axis, a lateral arm having a cam follower, a pivoted arm having a coöperating cam trackway, a pivoted supporting arm having a catch engagement with the trackway arm and an extension positioned to be engaged by the feed bar to release the trackway arm, and means normally active to return said arms to their normal position.

12. In a device of the character described, a paper holding magazine, guideways beneath and extending transversely of the magazine, slide blocks movable on said guideways, a paper feeding bar journaled in said blocks, paper engaging needles carried by said bar with their points outwardly of the pivot axis of the bar, means for reciprocating said bar, stops carried by the feed bar and its bearing slide blocks to limit the rocking movement of the bar in one direction, a cam trackway pivoted at one end, an arm carried by the feed bar and having engagement with the cam trackway to thereby rock the bar, a pivoted supporting bar extending across the outer end of the cam trackway bar and having a notch adapted to engage and support the trackway bar and its end positioned to be engaged by the feed bar to free said engagement with the trackway bar and springs engaging said trackway bar and its supporting bar to return them into engaged position.

Signed at Seattle, Washington, this 8th day of May, 1917.

SEVERIN HALVORSEN.